United States Patent Office 3,847,922
Patented Nov. 12, 1974

3,847,922
1,1,1-TRICHLORO-2-AMIDO-2-PIPERAZINO-
ETHANES AND SALTS THEREOF
Walter Ost, Klaus Thomas, and Dietrich Jerchel, Ingelheim am Rhein, Germany, assignors to C. H. Boehringer Sohn, Ingelheim am Rhein, Germany
No Drawing. Continuation-in-part of application Ser. No. 71,262, Sept. 10, 1970, now Patent No. 3,707,477, dated Dec. 26, 1972. This application Sept. 15, 1972, Ser. No. 289,751
Int. Cl. C07d 51/64
U.S. Cl. 260—268 R         2 Claims

ABSTRACT OF THE DISCLOSURE

Compounds of the formula

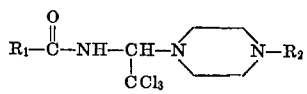

wherein $R_1$ is hydrogen, alkyl of 1 to 17 carbon atoms, alkenyl of 2 to 3 carbon atoms, monohalo-, dihalo- or trihalo-methyl, phenyl or ethoxy, and $R_2$ is hydrogen, methyl, phenyl, monochloro-phenyl, pentachloro-phenyl, nitroso, cyano, β-hydroxy-ethyl

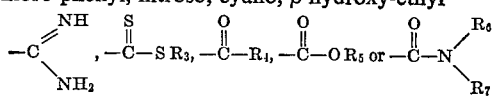

where $R_3$ is hydrogen or one equivalent of a sodium, potassium, ammonium, zinc, copper(II) or manganese(II) cation, $R_4$ is hydrogen, alkyl of 1 to 4 carbon atoms, monochloro-, dichloro- or trichloro-methyl, phenyl or (2,4-dichloro-phenoxy)-methyl, $R_5$ is hydrogen, alkyl of 1 to 3 carbon atoms, monohalo-, dihalo- or trihalo-ethyl, β-methoxy-ethyl, cyclohexyl, allyl, phenyl or

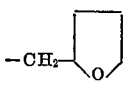

$R_6$ is hydrogen, methyl, allyl or phenyl, and
$R_7$ is hydrogen or methyl, and acid addition salts thereof; the compounds as well as their salts are useful as contact or systemic biocidal or biostatic agents, especially against mildew and various other fungi.

———

This is a continuation-in-part of copending application Ser. No. 71,262, filed Sept. 10, 1970.

This invention relates to novel 1,1,1-tricholor-2-amido-2-piperazino-ethanes and acid addition salts thereof, as well as to methods of preparing these compounds.

More particularly, the present invention relates to a novel class of compounds represented by the formula

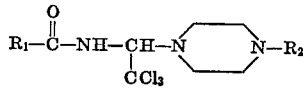

wherein $R_1$ is hydrogen, alkyl of 1 to 17 carbon atoms, alkenyl of 2 to 3 carbon atoms, monohalo-, dihalo- or trihalo-methyl, phenyl or ethoxy, and $R_2$ is hydrogen, methyl, phenyl, monochloro-phenyl, pentachloro-phenyl, nitroso, cyano, β-hydroxy-ethyl,

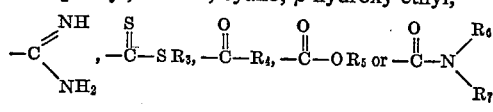

where $R_3$ is hydrogen or one equivalent of a sodium, potassium, ammonium, zinc, copper(II) or manganese(II) cation, $R_4$ is hydrogen, alkyl of 1 to 4 carbon atoms, monochloro-, dichloro- or trichloro-methyl, phenyl or (2,4-dichloro-phenoxy)-methyl, $R_5$ is hydrogen, alkyl of 1 to 3 carbon atoms, monohalo-, dihalo- or trihalo-ethyl, β-methoxy-ethyl, cyclohexyl, allyl, phenyl or

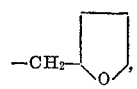

$R_6$ is hydrogen, methyl, allyl or phenyl, and
$R_7$ is hydrogen or methyl,
and acid addition salts thereof.

The compounds embraced by formula I above may be prepared by various methods involving well known chemical principles, among which the following are particularly preferred:

By reacting a 1,1,1-trichloro-2-amido-ethane of the formula

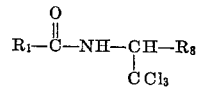

wherein $R_1$ has the same meaning as in formula I and $R_8$ is a substituent which can be readily split off as an anion, preferably bromine or chlorine, with a piperazine of the formula

wherein $R_2$ has the same meanings as in formula I. The reaction is advantageously performed in the presence of an acid acceptor, preferably a tertiary aliphatic amine, such as triethylamine. If the amine of the formula III is a relatively strong base, a commensurate excess over the stoichiometric amount required for reaction with compound II may serve as the acid acceptor. The reaction is advantageously also performed in the presence of an inert organic solvent, such as acetone, ether, tetrahydrofuran, methylene chloride, dimethylformamide or a lower alkanol.

A compound of the formula I wherein $R_2$ is other than hydrogen may also be prepared by reacting a 1,1,1-trichloro-2-amido-2-piperazino-ethane of the formula

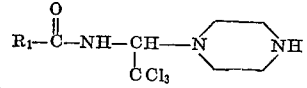

wherein $R_1$ has the same meanings as in formula I, or a salt thereof, with the desired reaction partner, such as $HNO_2$, acylating agent, isocyanate, etc.

The starting compounds of the formula IV or their salts may be prepared by reacting a 1,1,1-trichloro-2-amido-ethane of the formula II with piperazine within a very definite pH-range. If the reaction is carried out at a pH above the optimum value, symmetrical di-substitution products of the formula

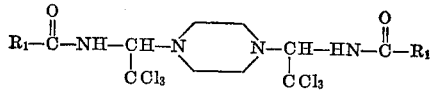

are formed. On the other hand, at a pH below the optimum value no reaction at all takes place. Thus, the compounds of the formula IV and their salts may be used as starting materials for a variety of asymmetrically substituted piperazine derivatives and are therefore useful as intermediates for the preparation of biocidal and biostatic agents.

The following examples further illustrate the present invention and will enable others skilled in the art to understand it more completely. It should be understood, however, that the invention is not limited solely to the particular examples given below.

EXAMPLE 1

A solution of 34.4 gm. of piperazine in 220 ml. of water was adjusted to a pH of 4.0 by addition of 2N hydrochloric acid (about 500 ml. of HCl were required). While vigorously stirring the acidic solution, a solution of 84 gm. of N-(1,2,2,2 - tetrachloro-ethyl)-formamide in 200 ml. of acetone and an aqueous concentrated solution of 80 gm. of sodium acetate were simultaneously added; the rate of addition of the sodium acetate solution was metered in such a way that the pH of the mixture remained at 4.0±0.1. Thereafter, the mixture was stirred for fifteen minutes more at room temperature, then the small amount of precipitated N,N-bis-(1-formamido-2,2,2-trichloro-ethyl)-piperazine was filtered off, and the filtrate was admixed with 200 ml. of aqueous 20% sodium hydroxide while cooling to 5° C. Subsequently, 200 ml. of methylene chloride were added, and the aqueous phase was separated and saturated with potassium carbonate. A colorless, crystalline precipitate was formed which was collected by vacuum filtration and recrystallized from acetone, yielding the water-soluble free base, m.p. 122–123° C., of the formula

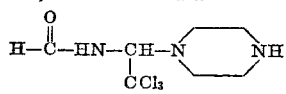

The hydrochloride, m.p. 182° C. (decomp.), was obtained by adding the calculated amount of hydrochloric acid to an aqueous solution of the free base, and gently evaporating the mixture in vacuo.

EXAMPLE 2

5.6 gm. of powdered N-(o-chloro-phenyl)-piperazine monohydrochloride monohydrate were suspended in a mixture of 50 ml. of tetrahydrofuran and 5.1 gm. of triethylamine, and then, while stirring, a solution of 5.3 gm. of N-(1,2,2,2-tetrachloro-ethyl)-formamide was added dropwise at room temperature. The resulting mixture was stirred at room temperature for two hours more and then for one hour at 65° C., the precipitated triethylamine hydrochloride was separated by vacuum filtration, the filtrate was evaporated in vacuo, and the residue was made to crystallize by treatment with ethanol. The crystalline raw product was recrystallized from ethanol/water, yielding the compound, m.p. 153–155° C., of the formula

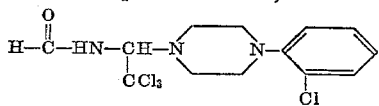

EXAMPLE 3

A solution of 1.4 gm. of potassium cyanide in 15 ml. of water was added dropwise to a vigorously stirred mixture of 3.2 gm. of bromine and 40 ml. of water. After disappearance of the bromine color, 5.2 gm. of N-(1-formamido-2,2,2-trichloro-ethyl)-piperazine were added in several small portions to the bromocyan solution. Thereafter, 2.06 gm. of sodium carbonate were added, and the mixture was stirred for two hours at room temperature. The precipitate formed thereby was collected by vacuum filtration, dried at room temperature and dissolved in chloroform, and the solution was admixed dropwise with ether, yielding the colorless crystalline compound, m.p. 109–110° C., of the formula

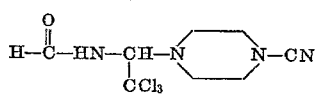

EXAMPLE 4

While vigorously stirring a solution of 2.6 gm. of N-(1-formamido-2,2,2-trichloro-ethyl)-piperazine in 20 ml. of tetrahydrofuran at 50° C., first a solution of 0.76 gm. of carbon disulfide in 10 ml. of tetrahydrofuran and then 5 ml. of 2N sodium hydroxide were added dropwise thereto, and the mixture was stirred for one hour at room temperature. Thereafter, the tetrahydrofuran was distilled off in vacuo on a water bath at 40° C., the residue was stirred with isopropyl ether, the mixture was vacuum-filtered, and the filter cake was dried at room temperature, yielding the yellowish crystalline sodium dithiocarbamate of the formula

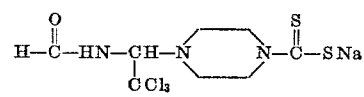

3.6 gm. of the sodium salt were dissolved in 60 ml. of ethanol and, while stirring the solution, a solution of 0.7 gm. of zinc chloride in 50 ml. of ethanol was added dropwise thereto. The mixture was stirred at room temperature for 30 minutes, and then 150 ml. of water were added. The precipitate formed thereby was collected by vacuum filtration, washed with water and dried at 50° C., yielding the corresponding zinc salt, m.p. 250° C. (decomp.), of the formula

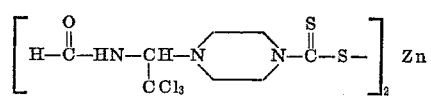

EXAMPLE 5

A solution of 3.2 gm. of triethylamine in 25 ml. of tetrahydrofuran was added dropwise to a solution of 3.4 gm. of N-formyl-piperazine and 6.3 gm. of N-(1,2,2,2-tetrachloro-ethyl)-formamide in 75 ml. of tetrahydrofuran, while stirring. The resulting mixture was stirred for two hours more at room temperature, the precipitated triethylamine hydrochloride was vacuum-filtered off, and the tetrahydrofuran was distilled out of the filtrate in vacuo. The residual raw product was recrystallized from ethanol, yielding the compound, m.p. 98–101° C., of the formula

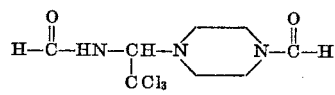

EXAMPLE 6

1.22 gm. of acetic acid anhydride were added to a solution of 3.9 gm. of N-(1-formamido-2,2,2-trichloro-ethyl)-piperazine in 10 ml. of tetrahydrofuran, and the mixture was heated at its boiling point for two hours. Thereafter, the reaction mixture was allowed to cool, poured over ice, and the precipitated semi-solid product was extracted with five 15 ml.-portions of methylene chloride. The combined extract solutions were dried over sodium sulfate and then evaporated, and the residue was recrystallized from isopropanol/hexane, yielding the compound, m.p. 149–150° C., of the formula

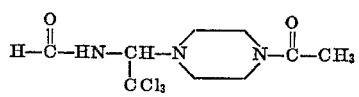

EXAMPLE 7

17.2 gm. of piperazine were dissolved in water, and the pH of the resulting solution was adjusted to 2.0 by addition of 2N hydrochloric acid. While vigorously stirring the acidic solution, 42 gm. of powdered N-(1,2,2,2-tetrachloroethyl)-formamide were added in small portions, and simultaneously a concentrated aqueous sodium acetate solution was added at a rate such that the pH was maintained at 2.0±0.1. Thereafter, the acidic reaction solution was carefully saturated with potassium carbonate. The oil precipitated thereby was taken up in ethanol, and the resulting solution was allowed to stand for 12 hours at room temperature. The small amount of precipitated N,N′ - bis-(1-formamido-2,2,2-trichloroethyl) - piperazine was filtered off, the ethanol was distilled out of the filtrate, and the semi-solid residue was recrystallized from ethanol/water, yielding the compound, m.p. 77–80° C., of the formula

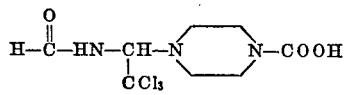

The product was insoluble in dilute alkalis.

EXAMPLE 8

A solution of 1.6 gm. of tetrahydrofurfuryl chloroformate in 20 ml. of methyl ethyl ketone was added dropwise to a solution of 2.6 gm. of N-(1-formamido-2,2,2-trichloroethyl)-piperazine and 1.1 gm. of triethylamine in 30 ml. of methyl ethyl ketone, while stirring. The resulting mixture was heated at its boiling point for ten minutes, then cooled and poured into ice water. The oil which precipitated out was extracted with benzene, and the extract solution was washed with water, dried with sodium sulfate and evaporated in vacuo. The oily residue crystallized upon stirring with hexane, yielding the compound, m.p. 72–75° C., of the formula

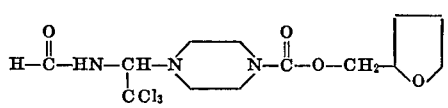

EXAMPLE 9

2.6 gm. of N - (1 - formamido-2,2,2-trichloro-ethyl)-piperazine were dissolved in 5 ml. of 2N hydrochloric acid, the solution was cooled to 5° C., and then a solution of 0.97 gm. of potassium cyanate in 20 ml. of water was added. The resulting mixture was stirred for 30 minutes at room temperature, whereupon a colorless precipitate began to form. The mixture was allowed to stand for twenty hours at room temperature, and the precipitate was collected by vacuum filtration, washed with water and dried below 50° C., yielding the compound, m.p. 175–176° C., of the formula

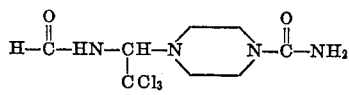

EXAMPLE 10

0.71 ml. of methyl isocyanate were added to a solution of 2.6 gm. of N - (1 - formamido-2,2,2-trichloroethyl)- piperazine in 10 ml. of absolute tetrahydrofuran, and the resulting mixture was allowed to stand at room temperature for 18 hours. Thereafter, the tetrahydrofuran was distilled off in vacuo, and the solid residue was recrystallized from isopropanol/hexane, yielding the compound, m.p. 166–167° C. (decomp.), of the formula

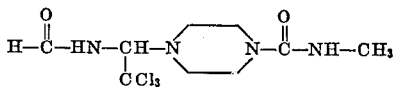

Using procedures analogous to those described in Examples 1–10 and correspondingly substituted starting compounds, the compounds listed in the following tables were also prepared:

TABLE I

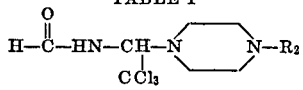

| Example No. | $R_2$ | Melting point in ° C. (recrystallized from) | Remarks |
|---|---|---|---|
| 11 | $CH_3-$ | 143–144 (toluene) | |
| 12 | $C_6H_5-$ | 112–114 (diethyl ether) | |
| 13 | 4-Cl-C$_6$H$_4$- (phenyl with Cl) | 158–159 (ethanol/water) | |
| 14 | Cl-C$_6$H$_4$- | 155–159 (ethanol/water) | |
| 15 | 2,3,4,5-tetrachlorophenyl | 171–172 (acetonitrile) | |
| 16 | ON— | 92–95 | After 2 weeks' standing of the oily crude product. |
| 17 | H$_2$N\C(=NH)— | | Light-brown resin. |
| 18 | $HO-CH_2-CH_2-$ | | Yellowish wax. |
| 19 | $(CH_3)_3C-CO-$ | 189–190 [decomp.] | |
| 20 | $C_6H_5-CO-$ | 194 [decomp.] | |
| 21 | 2,4-Cl$_2$-C$_6$H$_3$-O-CH$_2$-CO- | 190–191 [decomp.] | |
| 22 | $CH_3-O-CO-$ | 145 (methyl ethyl ketone/water) | |
| 23 | $C_2H_5O-CO-$ | 110–112 (diethyl ether) | |
| 24 | $(CH_3)_2CH-O-CO-$ | 128 | |
| 25 | $CCl_3CH_2-O-CO-$ | 148–150 (ethanol/water) | |
| 26 | $CH_3-O-CH_2-CH_2-O-CO-$ | 94–96 | |
| 27 | tetrahydrofurfuryl-O-CO- | 138–140 (methyl ethyl ketone/water) | |
| 28 | $C_6H_5O-CO-$ | 175 | |
| 29 | $C_6H_5NH-CO-$ | 165–168 (toluene) | |
| 30 | $CH_2=CH-CH_2-NH-CO-$ | 171 (acetone) | |
| 31 | $(CH_3)_2N-CO-$ | 124–126 (ethyl-acetate/hexane) | |

TABLE II

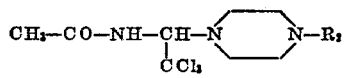

| Example No. | R₂ | Melting point in °C. | Remarks |
|---|---|---|---|
| 32 | CH₃— | 127–128 | |
| 33 | ON— | 109–111 | |

TABLE III

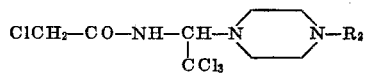

| Example No. | R₂ | Melting point in °C. | Remarks |
|---|---|---|---|
| 34 | CH₃— | 186–188 [decomp.] | After boiling with hexane. |

TABLE IV

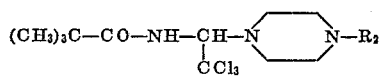

| Example No. | R₂ | Melting Point in °C. (recrystallized from) | Remarks |
|---|---|---|---|
| 35 | CH₃— | 124–126 (hexane) | |
| 36 | ON— | 148–150 | After boiling with hexane |

TABLE V

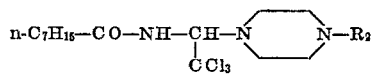

| Example No. | R₂ | Melting point in °C. | Remarks |
|---|---|---|---|
| 37 | ON— | 76–77 | |

TABLE VI

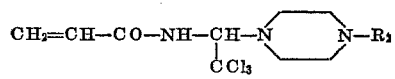

| Example No. | R₂ | Melting point in °C. | Remarks |
|---|---|---|---|
| 38 | CH₃— | 100–103 | |
| 39 | ON— | | Light yellow, viscous oil. |

TABLE VII

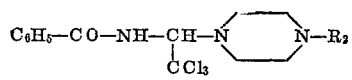

| Example No. | R₂ | Melting point in °C. | Remarks |
|---|---|---|---|
| 40 | CH₃— | 113–115 | |
| 41 | ON— | 184–185 | After boiling with hexane. |
| 42 | HO—CH₂—CH₂— | 126–128 (benzene/hexane) | |
| 43 | CH₃\N—(CH₂)₃—\CH₃ | Dihydrochloride: 202–204 | |

TABLE VIII

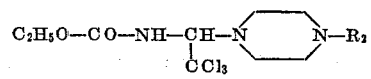

| Example No. | R₂ | Melting point in °C. (recrystallized from) | Remarks |
|---|---|---|---|
| 44 | ON— | | Colorless oil. Analysis: Calcd.: 32.5% C; 4.6% H; 16.9% N. Found: 32.3% C; 4.6% H; 16.6% N. |
| 45 | OHC— | 95–97 (benzene/hexane) | |

The compounds according to the present invention, that is, those embraced by formula I and their acid addition salts, have useful biocidal and biostatic properties. More particularly, the compounds according to the present invention are useful for combatting a broad spectrum of pathogenic fungi and bacteria, such as mildew, Aspergillus, Xanthomonas, Pseudomonas and Fusarium and for combatting insects and acarids, such as aphids and spider mites.

Especially effective against genuine mildew fungi are those compounds of the formula I wherein $R_1$ is hydrogen and $R_2$ is hydrogen, methyl, nitroso, cyano, $\beta$-hydroxyethyl,

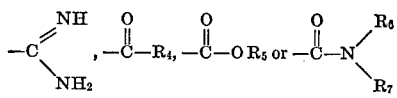

where $R_4$, $R_5$, $R_6$ and $R_7$ have the meanings previously defined.

Thus, for example, the compounds of Examples 15, 18, 25 and 26 are especially effective as contact fungicides against genuine mildew fungi on plants; the compound of Example 6 is an especially effective systemic fungicide against mildew fungi on plants; the compounds of Examples 7, 16, 17 and 23 are effective contact and systemic fungicides against mildew fungi on plants.

The growth of *Aspergillus niger* is effectively inhibited, for example, by the compounds of Examples 5, 12, 25, 27, 28 and 30.

Effective against *Fusarium oxysp.* are, for example, the compounds of Examples 4, 25, 26, 27, 28 and 30.

Very effective bacteriocides against *Pseudomonas morsprunorum* are, for example, the compounds of Examples 22, 25, 28 and 30; against *Xanthomonas malv.* the compounds of Examples 4, 25, 27, 28 and 30; against *Pythium ultim.* the compounds of Examples 3, 4, 25, 27 and 30; and against *Rhizoctonia solani* the compounds of Examples 3 and 4.

For the purpose of controlling or combatting the growth of the various microorganisms set forth above, the compounds according to the present invention are applied to areas infested with such microorganisms as active ingredients in conventional liquid or solid compositions, such as dusting powders, suspensions, emulsions, solutions, aerosols and the like. Such compositions may additionally comprise conventional inert auxiliary ingredients, such as emulsifiers, diluents and adhesion-enhancing agents, as well as other biocidal or biostatic ingredients. The effective concentration range of the compounds of the instant invention in such compositions is from 0.00001 to 1% by weight, preferably 0.001 to 0.5% by weight, based on the total weight of the composition. Dusting powders and so-called ultra-low-volume (ULV) compositions may have a higher concentration of active ingredient.

The following examples illustrate a few compositions comprising a compound according to the present invention as an active ingredient and represent the best modes contemplated of putting the invention into practical use. The parts are parts by weight unless otherwise specified.

EXAMPLE 46

Dusting powder

The powder is compounded from the following ingredients:

| | Parts |
|---|---|
| 1,1,1-Trichloro-2-formamido-2-piperazinoethane | 1 |
| Talcum | 98 |
| Methyl cellulose | 1 |

The ingredients are admixed with each other, and the mixture is milled into a homogeneous powder. The resulting dusting powder is an effective contact fungicide for use on plants infested with genuine mildew.

EXAMPLE 47

Wettable Powder

The powder is compounded from the following ingredients:

| | Parts |
|---|---|
| 1,1,1 - Trichloro - 2 - formamido - 2 - (N' - acetyl-piperazino)-ethane | 25 |
| Kaolin | 55 |
| Colloidal silicic acid | 10 |
| Lignin sulfonate (dispersing agent) | 9 |
| Sodium tetrapropylene - benzene - sulfonate (wetting agent) | 1 |

The ingredients are admixed with each other, and the mixture is milled into a homogeneous powder. Prior to use, the powder is suspended in a sufficient amount of water to make the active ingredient concentration in the aqueous suspension from 0.0001 to 0.5%. The resulting sprayable suspension is an effective systemic fungicide for use on plants infested with mildew and similar fungi.

EXAMPLE 48

Emulsion Concentrate (a) The concentrate is compounded from the following ingredients:

| | Parts |
|---|---|
| 1,1,1-Trichloro-2-formamido-2-piperazinoethane | 10 |
| Sodium tetrapropylene - benzene - sulfonate anionic emulsifier) | 5 |
| Nonylphenol polyglycol ether (nonionic emulsifier) | 20 |
| Propylene glycol | 32.5 |
| N-Methyl-pyrrolidone | 32.5 |

The ingredients are admixed with each other in conventional fashion to make an emulsion concentrate which, prior to use, is emulsified in a sufficient amount of water to make the active ingredient concentration in the aqueous emulsion between 0.0001 and 0.5% by weight, based on the total weight. The resulting sprayable aqueous emulsion is an effective contact and systemic fungicide for use on plants infested with genuine mildew and similar fungi.

EXAMPLE 49

Wettable Powder

The powder is compounded from the following ingredients:

| | Parts |
|---|---|
| 1,1,1 - Trichloro - 2 - formamido - 2 - (N' - carboxyl-piperazino)-ethane | 80 |
| Calcium lignin sulfonate | 8 |
| Colloidal silicic acid | 5 |
| Sodium sulfate | 5 |
| Diisobutyl naphthalene sodium sulfonate | 2 |

The ingredients are admixed with each other, and the mixture is milled into a homogeneous powder. Prior to use, the powder is suspended in a sufficient amount of water to make the active ingredient concentration in the aqueous suspension from 0.0001 to 0.5%. The resulting sprayable suspension is an effective contact and systemic fungicide for use on plants infested with mildew and similar fungi.

EXAMPLE 50

Aerosol Spray

The aerosol composition was compounded from the following ingredients:

| | Parts |
|---|---|
| 1,1,1-Trichloro-2-formamido-2-(N'-formyl - piperazino)-ethane | 0.05 |
| Sesame oil | 0.10 |
| N-Methyl-pyrrolidone | 10.00 |
| Mixture of Frigen 11 and 12 | 89.85 |

The trichloroethane compound, the sesame oil and the N-methyl-pyrrolidone were admixed with each other, and the mixture was charged into an aerosol can equipped with an aerosol spray valve. The cans were then pressurized with the propellant gas mixture in conventional manner. The aerosol spray discharged from the pressurized can was an effective fungistatic contact composition for use in inhibiting the growth of *Aspergillus niger*.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula $$R_1-\overset{O}{\overset{\|}{C}}-NH-\underset{\underset{CCl_3}{|}}{CH}-N\underbrace{\phantom{XXX}}N-R_2$$

wherein $R_1$ is hydrogen, alkyl of 1 to 7 carbon atoms, allyl or ethoxy, and $R_2$ is hydrogen, methyl, phenyl, monochloro-phenyl, pentachloro-phenyl, nitroso, cyano, β-hydroxy-ethyl $$-\overset{NH}{\underset{NH_2}{\overset{\|}{C}}}, \quad -\overset{S}{\overset{\|}{C}}-SR_3, \quad -\overset{O}{\overset{\|}{C}}-R_4, \quad -\overset{O}{\overset{\|}{C}}-OR_5 \text{ or } -\overset{O}{\overset{\|}{C}}-N\overset{R_6}{\underset{R_7}{\diagdown}}$$

where $R_3$ is hydrogen, or one equivalent of a sodium, potassium, ammonium, zinc, copper(II) or manganese(II) cation, $R_4$ is hydrogen, alkyl of 1 to 4 carbon atoms, monochloro-, dichloro- or trichloro-methyl, phenyl or (2,4-dichlorophenoxy)-methyl, $R_5$ is hydrogen, alkyl of 1 to 3 carbon atoms, monohalo-, dihalo- or trihalo-ethyl, β-methoxy-ethyl, cyclohexyl, allyl, phenyl or $$-CH_2-\underbrace{\phantom{XX}}_{O}$$

$R_6$ is hydrogen, methyl, allyl or phenyl, and $R_7$ is hydrogen or methyl, or an acid addition salt thereof.

2. A compound of claim 1 which is 1,1,1-trichloro-2-formamido-2-piperazino-ethane or an acid addition salt thereof.

References Cited

UNITED STATES PATENTS 3,696,106  10/1972  Walker Ost et al. ___ 260—268 R
3,455,940  7/1969   Stecker _____ 260—268 R

OTHER REFERENCES

Chemical Abstracts, vol. 72, 1970, 3053S.
Chemical Abstracts, vol. 72, 1970, 3146y.

DONALD G. DAUS, Primary Examiner

M. C. VAUGHN, Assistant Examiner

U.S. Cl. X.R.

260—268 C, 268 PH, 268 N, 268 CN, 242; 424—250